United States Patent [19]

Kerner

[11] Patent Number: 4,771,650
[45] Date of Patent: Sep. 20, 1988

[54] STEERING WHEEL ARRANGEMENT FOR VEHICLES

[75] Inventor: Wolfgang Kerner, Stuttgart, Fed. Rep. of Germany

[73] Assignee: Daimler-Benz Aktiengesellschaft, Stuttgart, Fed. Rep. of Germany

[21] Appl. No.: 65,876

[22] Filed: Jun. 24, 1987

[30] Foreign Application Priority Data

Jun. 25, 1986 [DE] Fed. Rep. of Germany ....... 3621226

[51] Int. Cl.$^4$ .......................... B62D 1/16; B60R 21/16
[52] U.S. Cl. .................................. 74/498; 74/421 R; 280/731
[58] Field of Search ............. 74/498, 421 R; 280/731, 280/750

[56] References Cited

U.S. PATENT DOCUMENTS

| 3,543,874 | 12/1970 | Nevett | 74/498 X |
| 3,744,817 | 7/1973 | Ousset | 280/731 X |
| 3,801,123 | 4/1974 | Jira | 280/731 |
| 3,910,597 | 10/1975 | Seko | 280/731 |
| 4,183,550 | 1/1980 | Sudou | 280/731 X |
| 4,429,588 | 2/1984 | Emundts et al. | 74/498 X |

FOREIGN PATENT DOCUMENTS 2131902 12/1972 Fed. Rep. of Germany .
2625184 12/1977 Fed. Rep. of Germany .
2842020 5/1980 Fed. Rep. of Germany .

Primary Examiner—Allan D. Herrmann
Attorney, Agent, or Firm—Barnes & Thornburg

[57] ABSTRACT

A steering wheel arrangement for motor vehicles with a dish-shaped steering wheel provided with a steering wheel hub which is adapted to be flangedly connected on a central steering spindle rotatably supported in a casing, and with an impact device arranged inside of the steering wheel dish which maintains its position independently of the rotation of a steering wheel rim, whereby a gearing in the form of a pinion shaft is provided which is supported parallel to the steering spindle and has two identical pinions non-rotatably arranged on the same; the pinions are in engagement with gears coaxially supported with respect to the steering spindle, of which the first gear is arranged on the side of the steering column casing and the second gear on the side of the impact device. The first gear is thereby rotatably supported on the casing and is non-rotatably connected with the steering wheel rim while the second gear is attached safe against rotation on an end section of the steering spindle and a support flange fixed at the casing protrudes between the two gears whereby the pinion shaft is supported in the support flange and the impact device is locally secured at the same.

14 Claims, 1 Drawing Sheet

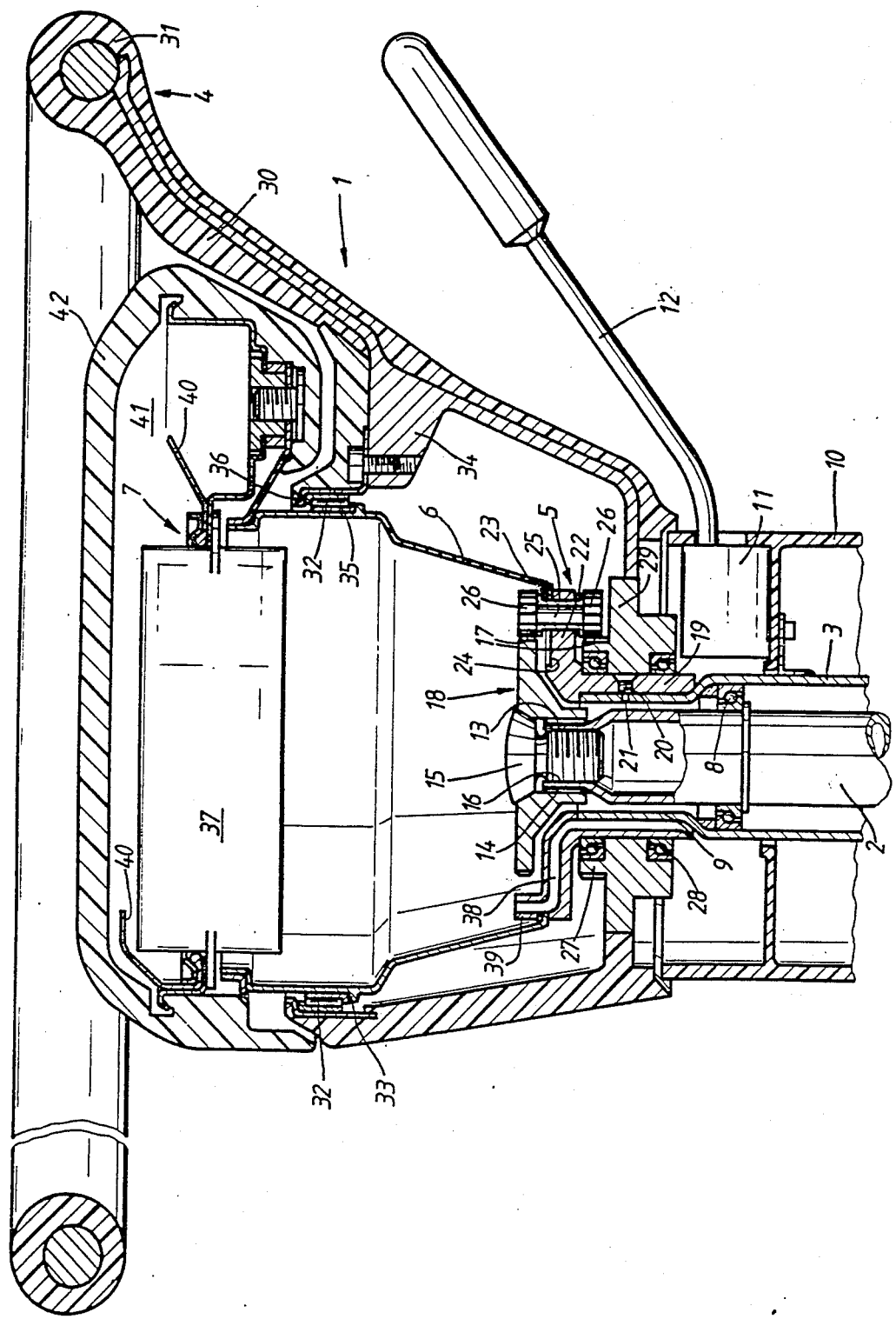

STEERING WHEEL ARRANGEMENT FOR VEHICLES

BACKGROUND AND SUMMARY OF THE INVENTION

The present invention relates to a steering wheel arrangement for vehicles, with a dish-shaped steering wheel provided with a steering wheel hub which is adapted to be flangedly connected on a central steering spindle rotatably supported in a steering column casing, and which includes an impact device arranged inside the steering wheel dish which maintains its position independently of the rotation of a steering wheel rim.

A steering wheel arrangement of this type is already disclosed in the DE-PS No. 26 25 184, whereby an impact cushion or an air bag is provided as impact device. This steering wheel arrangement already makes it possible, without requiring expensive conversion constructions, to flangedly connect the steering wheel on a customary central steering spindle. On the other hand, the impact device is rotated along during the rotation of the steering wheel opposite the direction of rotation thereof because the pinion shaft is supported as planet pinion in the manner of a planetary gear so that the impact device is held only quasi-stationary.

However, vibration-technical inadequacies result from this system which increase in dependence on the weight of the attachment parts integrated in the steering wheel dish, and which may lead to annoying rattle noises during the driving operation. Thus, for example, an air bag weighs about 2 kilograms. Added thereto is further the weight of an impact pot customarily combined with the air bag and the weight of the necessary covering parts. Further problems also result from the fact that the pyrotechnical charge of the air bag requires an electrical initial ignition so that an electrical connection with the power supply of the motor vehicle must be provided.

An electrical contact between the power supply and the gas generator is thereby possible only by means of costly technical solutions such as, for example, by means of slip ring contacts or the like.

This contact problem consists in a steering wheel without integrated air bag also when a contact plate for a signalling horn or comparable functional elements are arranged on an impact pot.

The present invention is concerned with the task to further develop a steering wheel arrangement of the aforementioned type to the extent that a bearing support of the steering wheel which is not prone to annoying noises can be assured far-reachingly independently of the weight of the impact device.

The underlying problems are solved according to the present invention in that a first gear is rotatably supported on the steering column casing and is non-rotatably connected with the steering wheel rim, in that a second gear is non-rotatably attached at an end section of the steering spindle, and in that a support flange fixed with the casing protrudes between the two gears, in which is supported the pinion shaft and on which the impact device is locally fixedly retained, whereby no planetary gear is now present but instead a simple guide or idling gear. As the impact device is now locally fixedly secured on the steering column casing, its weight will hardly be a factor in the vibration behavior of the steering wheel arrangement.

Therebeyond, a stationary cable lead-in from the casing to the impact device is now completely without problem.

According to further features of the present invention, a particularly compact type of construction of the steering wheel arrangement is attainable. The effective structural height of the steering wheel can thereby remain limited to the dimensions of a customary safety steering wheel so that in the alternative a normal safety steering wheel with a spoke hub or a safety steering wheel expanded by an air bag can now be screwed with the gear hub of the idling gearing onto the same end-face spline shaft teeth of the steering spindle.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a longitudinal cross-sectional view through a steering wheel arrangement in accordance with the present invention.

DETAILED DESCRIPTION OF THE DRAWING

Referring now to the single FIGURE of the drawing, the steering wheel arrangement generally designated by reference numeral 1 includes as main components a steering spindle 2, a steering column casing 3 as well as a dish-shaped steering wheel generally designated by reference numeral 4 with a guide or idling gear generally designated by reference numeral 5 and with an impact device arranged in the steering wheel dish and formed by an impact pot 6 and an air bag unit generally designated by reference numeral 7.

The steering spindle 2 is supported in the usual manner within the steering column casing 3 fixed on the body side and represents the rotary connection between a steering gear (not shown) and the steering wheel 4. Above an upper roller bearing 8 the casing 3 tapers to a casing neck 9 of cylindrical shape whose clear inner diameter is only slightly larger than the outer diameter of the steering spindle 2. Below the roller bearing 8, a casing cover 10 is retained on the circumference of the casing 3, in which actuating elements such as a turn-indicator switch 11 with an actuating lever 12 or similar devices are locally fixedly arranged.

An upper end section of the steering spindle 2 is also tapered and is provided circumferentially with axial teeth so that the end section forms a spline shaft 13. The spline shaft 13 protrudes with a considerable portion of its length out of the casing neck 9. A complementarily toothed spline hub 14 is mounted over the teeth of the spline shaft 13, so that an entrainment connection results therefrom. The axial seat of the spline hub 14 on the spline shaft 13 is secured by the endwise screwing-in a flat-head screw 15 into an internal thread 16 of the hollow spline shaft 13. Starting from a sleeve shape, the diameter of the spline hub 14 increases above the end face of the casing neck 9 in such a manner that in its upper end area an axially symmetrical disk is present. Circumferentially, this disk is provided with external teeth 17. By reason of this particular construction, this component will be referred to hereinafter as gear hub generally designated by reference numeral 18.

An accurately fitting tubular connecting section 19 is mounted over the casing neck 9 below the gear hub 18;

the tubular connecting section 19 is secured on the casing neck 9 safe against rotation and displacement. The fastening takes place in this case by means of several flat-head screws 20 whose shank is machined endwise into a locking pin 21. These flat-head screws 20, whose shank length with original diameter is matched to the wall thickness of the tubular-connecting section 19, are screwed into fitting threaded bores in the tubular-connecting section 19 and form-lockingly engage with the locking pins 21 in coordinated bores provided in the casing neck 9. The tubular-connecting section 19 extends over the entire length of the casing neck 9 and above the casing neck 9 passes over into a radially protruding support flange 22 which is directly formed-on thereat at the tubular-connecting section 19 and which has the shape of a circumferential collar. The support flange 22 is thereby matched as regards the extent of its radial dimension to the facing contour of the gear hub 18 and has a larger diameter than the gear hub 18 itself whereby the diameter of the support flange 22 corresponds approximately to the bottom diameter of the impact pot 6. A circular opening is provided in the bottom of the impact pot 6 so that the impact pot 6 only still has a circular ring-shaped edge 23 within the bottom area. This edge 23 is detachably or non-detachably secured abutting on the side of the support flange 22 facing the gear hub 18. For achieving a still more compact type of construction, the edge 23 can be arranged thereby recessed in a ring-shaped aperture 24.

Outside of the radial extent of the gear hub 18, one or possibly also several pinion shafts 25 are rotatably supported in the support flange 22 whose axial direction extends parallel to the center longitudinal axis of the steering spindle 2, and which extend through the support flange 22 and the edge 23 of the impact pot 6. The pinion shaft 25 is provided at its ends with two identical pinions 26 of which one meshes with the external teeth 17 of the gear hub 18. The second pinion 26 meshes in a similar externally toothed arrangement 17 of a gear 27 which is rotatably supported on the circumference of the tubular-connecting section 19 by means of a roller bearing 28 and is axially displaceably secured. A spoke hub 29, which is formed-on integrally at the gear 27, is connected by way of steering wheel spokes 30 with a steering wheel rim 31 of the steering wheel 4.

During the rotation of the steering wheel rim 31, the rotary movement is accordingly transmitted by way of the steering wheel spokes 31, the spoke hub 29 and the described guide or idling gear 5 onto the steering spindle 2 in the same direction of rotation and with constant angular velocity whereby the impact pot 6 remains in its rest position.

As a relative rotation must thereby take place between the impact pot 6 and the steering wheel spokes 30, it is appropriate to additionally support the impact pot 6 radially between the steering wheel spokes 30. For that purpose a support bearing 32 is arranged on the circumference of the impact pot 6 within the area of its largest diameter which does not impair the folding operation of the impact pot 6 during deformation. In order to make this possible, the support bearing 32 which abuts with its inner race on the circumference of the impact pot 6 is supported in the downward direction by means of an annular bead 33 which rests elevated on the impact pot wall.

Additionally, brackets 34 directed toward the impact pot 6 protrude from the steering wheel spokes 30 whereby support angle elements 35 are screwed onto the brackets 34. The support angle elements 35 abut inwardly at the outer race of the support bearing 32 and thus effect a radial support of the impact pot 6 with respect to the steering wheel spokes 30. For the further axial support, webs 36 of the support angle elements 35 which protrude at right angle, overlap the upper end face of the outer race so that a desired seating of the support bearing 32 is thus assured.

As the impact pot 6 is rigidly connected with the steering column casing 3, it no longer poses any problems to connect a gas generator 37 integrated in the usual manner into the impact pot 6 with the electrical power supply. For that purpose, a locally fixed cable shaft 38 is provided which connects the space inside of the casing covering 10 with the interior space of the impact pot 6. The cable shaft 38 starts from a lead-in opening in the lower end face of the tubular-connecting section 19, extends through the tubular-connecting section 19 along its length and then passes over into a radial shaft section in the support flange 22. The support flange 22 is traversed through radially up to an area not covered by the gear hub 18 where the cable shaft 38 terminates in an exit opening extending through the edge 23. In order to facilitate a sliding-through of the cables, a deflection connecting section 39 may be provided additionally whose outlet opening is directed upwardly.

In lieu of the one cable shaft 38, also several cable shafts 38 may be arranged distributed over the outer surface of the tubular-connecting section 19, respectively, the support flange 22 in case of need by reason of a larger number of cables.

As the air bag unit 7 with its gas generator 37 and an air bag or cushion 40, which is located in a not-illustrated manner folded within a packing space 41 underneath a tear-open cushion 42, is arranged essentially above the impact pot 6, quite a high location of the center of gravity results altogether for the impact device.

The support flange 22 must therefore be constructed so bending-rigid that during the absorption of the support forces resulting from the weight of the impact device which may differ depending on the installed location of the steering wheel arrangement 1, it is subjected only to slight elastic deformations. It is assured thereby that the bearing support of the pinion shaft 25 is adequately fixed locally, and therewith its longitudinal axis extends exactly parallel to the center longitudinal axis of the steering spindle 2. If this is assured, only the constructively provided flank clearance remains between the pinions 26 and the coordinated external teeth which can be absorbed within the scope of the customary steering play.

Annoying rattling noises do not occur any longer during the driving operation of a motor vehicle having the described steering wheel arrangement 1.

Beyond the advantage of a particularly compact type of construction, the described steering wheel arrangement 1 is further characterized in that it can be manufactured in a cost-favorable manner and is very easy to assemble.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A steering wheel arrangement for vehicles, comprising a dish-shaped steering wheel provided with a steering wheel rim fixedly attached to a steering wheel hub, a central steering spindle rotatably supported in a steering column casing, impact means arranged inside of the steering wheel dish which maintains its position independently of the rotation of the steering wheel rim, gear means including a pinion shaft supported substantially parallel to the steering spindle and having two similar pinions nonrotatably arranged on the pinion shaft, said pinion shaft and pinions being located within the steering wheel hub, said pinions being in operative engagement with gears coaxially supported with respect to the steering spindle and located within said hub, one of said gears being arranged on a side of the steering column casing and the other gear being arranged on a side of the steering spindle adjacent said impact means, the one gear being rotatably supported on said casing and being nonrotatably connected with the steering wheel hub while the other gear is nonrotatably connected with an end section of the steering spindle, and support flange means located within said hub and nonrotatably fixed with respect to said casing for protruding between the two gears, the pinion shaft being supported in said support flange means, and the impact means being locally retained at said support flange means.

2. A steering wheel arrangement according to claim 1, wherein the impact means includes an impact pot and an air bag unit.

3. A steering wheel arrangement according to claim 1, further comprising a tubular-connecting section operable to be secured on the upper end area of the casing, the support flange means protruding from said tubular-connecting section in the form of a circumferential collar.

4. A steering wheel arrangement according to claim 3, wherein said casing tapers into a casing neck above a bearing place of the steering spindle near the steering wheel hub.

5. A steering wheel arrangement according to claim 4, wherein the one gear is rotatably supported together with a spoke hub on the tubular-connecting section.

6. A steering wheel arrangement according to claim 5, wherein a cable shaft means is integrated into the tubular-connecting section and the support flange means.

7. A steering wheel arrangement according to claim 6, wherein the cable shaft means is substantially uninterrupted.

8. A steering wheel arrangement according to claim 6, wherein the impact means includes an impact pot provided with a bottom edge, the pinion shaft extending through the bottom edge, and said edge being secured on the circumferential collar of the support flange means.

9. A steering wheel arrangement according to claim 2, wherein said other gear is a gear hub means.

10. A steering wheel arrangement according to claim 1, wherein said casing tapers into a casing neck above a bearing place of the steering spindle near the steering wheel hub.

11. A steering wheel arrangement according to claim 3, wherein the one gear is rotatably supported together with a spoke hub on the tubular-connecting section.

12. A steering wheel arrangement according to claim 3, wherein a cable shaft means is integrated into the tubular-connecting section and the support flange means.

13. A steering wheel arrangement according to claim 12, wherein the cable shaft means is substantially uninterrupted.

14. A steering wheel arrangement according to claim 3, wherein the impact means includes an impact pot provided with a bottom edge, the pinion shaft extending through the bottom edge, and said edge being secured on the circumferential collar of the support flange means.

* * * * *